(12) United States Patent
Sato

(10) Patent No.: US 7,365,257 B2
(45) Date of Patent: Apr. 29, 2008

(54) STAND

(75) Inventor: Naoki Sato, Seto (JP)

(73) Assignee: Hoshin Gakki Mfg. Co., Ltd. (JP)

( * ) Notice: Subject to any disclaimer, the term of this patent is extended or adjusted under 35 U.S.C. 154(b) by 392 days.

(21) Appl. No.: 11/252,648

(22) Filed: Oct. 18, 2005

(65) Prior Publication Data

US 2007/0012160 A1 Jan. 18, 2007

(30) Foreign Application Priority Data

Jul. 14, 2005 (JP) ............... 2005-206032

(51) Int. Cl.
*G10D 13/02* (2006.01)
(52) U.S. Cl. ...................................... 84/421
(58) Field of Classification Search .......... 84/327, 84/329, 421
See application file for complete search history.

(56) References Cited

U.S. PATENT DOCUMENTS 5,949,006 A * 9/1999 Hechler ................. 84/291

7,208,666 B2 * 4/2007 Burch et al. ................. 84/327
2005/0274854 A1 * 12/2005 May ............................ 248/171

FOREIGN PATENT DOCUMENTS

JP 5-45793 6/1993
JP 2001-184056 7/2001

* cited by examiner

*Primary Examiner*—Kimberly Lockett
(74) *Attorney, Agent, or Firm*—Ostrolenk, Faber, Gerb & Soffen, LLP

(57) ABSTRACT

A stand body of a snare drum stand includes legs, a lower pipe, an intermediate pipe, and an upper pipe. Each leg has an upper end pivotally connected to a leg support, which is attached to the lower end of the intermediate pipe. One end of a stay is pivotally connected to the middle portion of each leg. The other end of the stay is pivotally connected to a stay support attached to a lower end of the lower pipe. The stay support moves integrally with the lower pipe in the stand body.

19 Claims, 5 Drawing Sheets

STAND

BACKGROUND OF THE INVENTION

The present invention relates to a stand for supporting an article represented by a percussion instrument such as a snare drum.

A typical stand for a snare drum includes a stand body and a stand basket for receiving the snare drum. The stand body is pivotally connected to a plurality of legs. For example, FIG. 5(B) shows a stand described in Japanese Laid-Open Patent Publication No. 2001-184056. The stand includes legs 95, each having an upper end pivotally connected to a movable sleeve 94a, which is fitted to a lower pipe 92. Further, each leg 95 has a middle portion pivotally connected to one end of a stay 97. The other end of the stay 97 is connected to a fixed sleeve 94b, which is fixed to the lower end of the lower pipe 92. The movable sleeve 94a is vertically moved relative to the lower pipe 92 so as to spread or fold the legs 95.

In addition to the above publication, Japanese Laid-Open Utility Model Publication No. 5-45793 describes a stand provided with a basket located at the upper side of an upper pipe. An angle adjustment mechanism pivotally connects the upper end of the upper pipe to an arm holder shaft, which is located along the axis of the basket. FIG. 6 shows a snare drum stand 100 including legs 101, each of which is pivotally connected to a fixed sleeve 103. The fixed sleeve 103 is fixed to the upper end of the lower pipe 102. A portion of each leg 101 that is lower than the middle of the leg 101 is pivotally connected to one end of a stay 104. The other end of the stay 104 is pivotally connected to a movable sleeve 105, which is fitted to the lower pipe 102. The movable sleeve 105 is vertically moved relative to the lower pipe 102 to spread or fold the legs 101.

The snare drum stand may be used to support a snare drum having a long shell. In such a case, the snare drum stand must stably support the bottom portion of the snare drum at a low position so that the batter head of the snare drum is located at a height in which the drum can easily be played. However, in the structure described in Japanese Laid-Open Patent Publication No. 2001-184056, the length of the lower pipe 92 is determined in accordance with the movable range d of the movable sleeve 94a. It is thus difficult to shorten the stand body 91 and further lower the support position of the snare drum. Further, in the structure described in Japanese Laid-Open Utility Model Publication No. 5-45793, the basket and the upper pipe are not coaxial. Thus, although the support position of the snare drum can be lowered more than that of the structure shown in FIG. 5(B), the snare drum cannot be stably supported. In the structure shown in FIG. 6, the fulcrum about which each leg 101 pivots is located on the fixed sleeve 103, which is fixed to the upper end of the lower pipe 102. In this case, the fulcrum of each leg 101 is located at a high position near the basket. Thus, a large space must be provided under the basket to spread out the legs 101. As a result, when the legs 101 are spread out, the legs 101 are apt to interfere with parts of devices located around the periphery of the snare drum. For example, as shown in FIG. 7, when a drummer plays a bass drum 2 with a twin pedal 110, a connecting rod 112 connecting left and right pedals 111a and 111b is apt to interfere with the legs 101 at point P, which is indicated in FIGS. 6 and 7. This may hinder with the playing of the drums.

SUMMARY OF THE INVENTION

It is an object of the present invention to provide a foldable stand that enables an article such as a percussion instrument to be stably supported at a low position.

One aspect of the present invention is a stand for supporting an article. The stand includes a basket for receiving the article. A stand body supports the basket. A plurality of legs are pivotally connect to the stand body. The stand body includes a main pipe. A lower pipe having an upper end is inserted into the main pipe. A leg support is arranged on the main pipe, with each leg being pivotally connected to the main pipe by the leg support. A stay support is arranged on the lower pipe. The stand body further includes a plurality of stays, each connected to a corresponding one of the legs and pivotally connected by the stay support to the lower pipe. The position of the lower pipe relative to the main pipe is changeable so that the leg support and the stay support move toward each other and spread the legs outward with the stays. The position of the lower pipe relative to the main pipe is changeable so that the leg support and the stay support move away from each other and fold the legs with the stays.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A stand according to a preferred embodiment of the present invention will now be described with reference to FIGS. 1 to 5. The stand is used as a snare drum stand 10.

Figure 1:
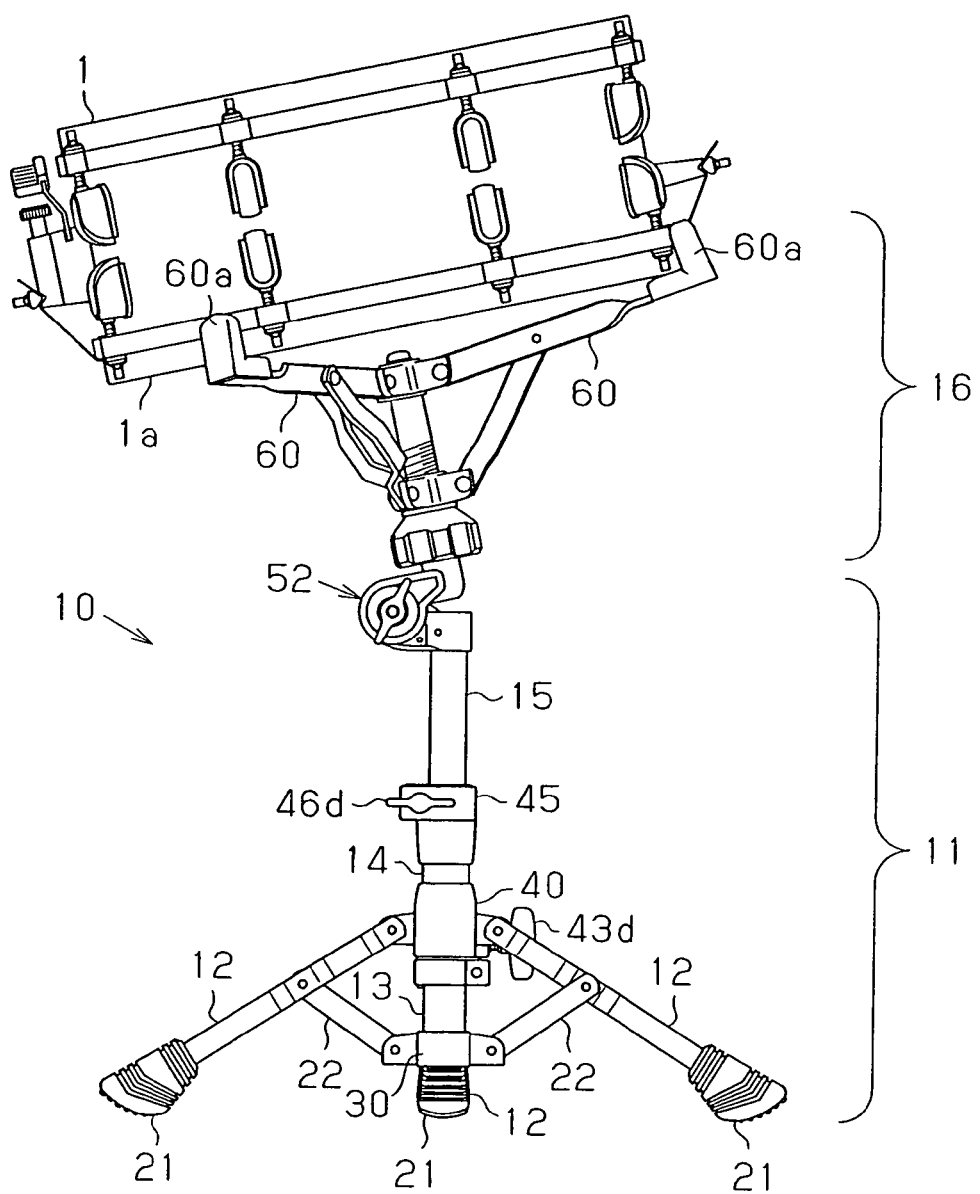
FIG. 1 is a front view showing the entire structure of a snare drum stand according to a preferred embodiment of the present invention.

Referring to FIG. 1, the snare drum stand 10 includes a stand body 11 and a basket 16 for receiving a snare drum 1. The stand body 11 includes three legs 12, a lower tube or pipe 13, an intermediate tube or pipe 14, and an upper tube or pipe 15. The diameter of the upper tube or pipe 15 is smaller than that of the lower pipe 13, and the diameter of the lower pipe 13 is smaller than that of the intermediate pipe 14. In the preferred embodiment, the intermediate pipe 14 and the upper pipe 15 form a main pipe.

Figure 2:
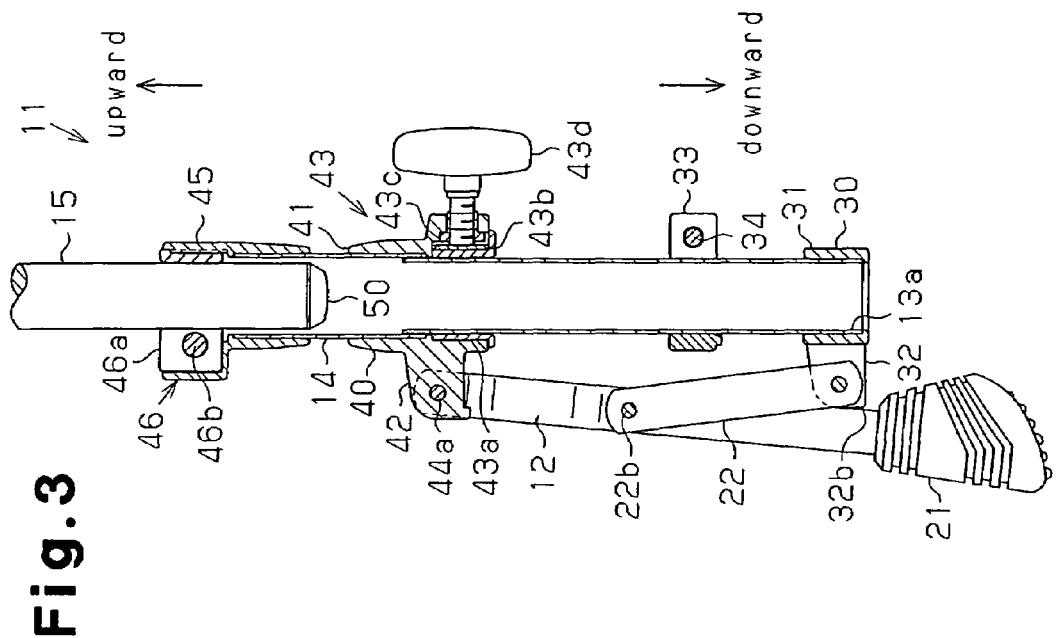
FIG. 2 is a partial cross-sectional view showing the snare drum stand of FIG. 1 in a state in which the legs are spread out.
Figure 3:
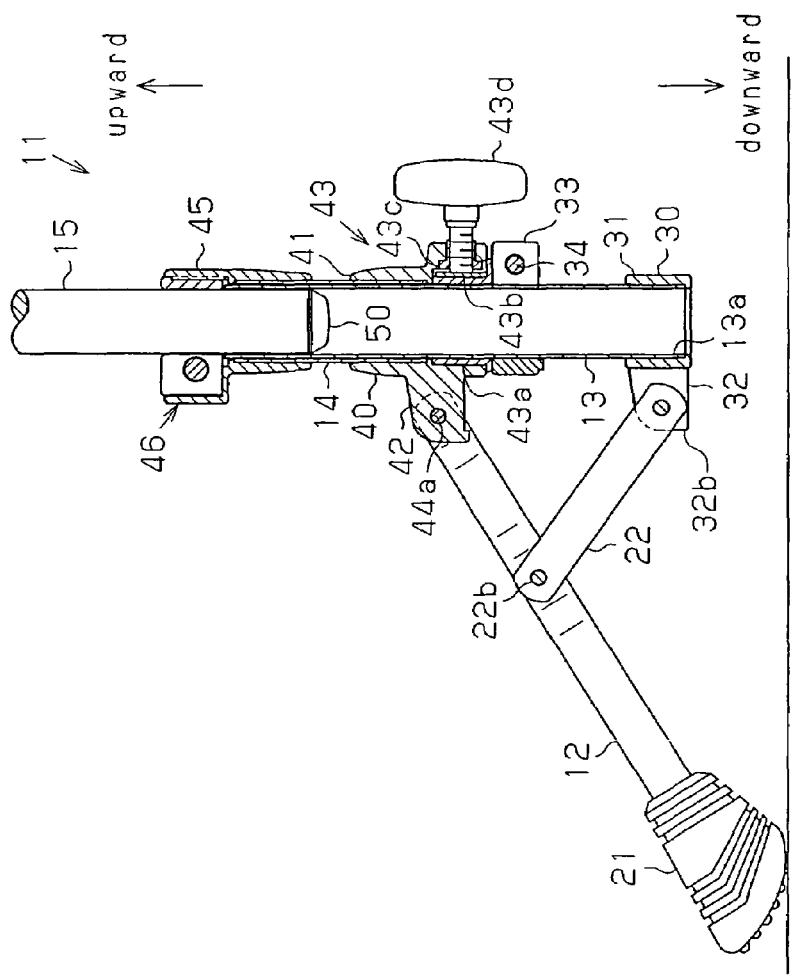
FIG. 3 is a partial cross-sectional view showing the snare drum stand of FIG. 1 in a state in which the legs are folded.
Figure 4:
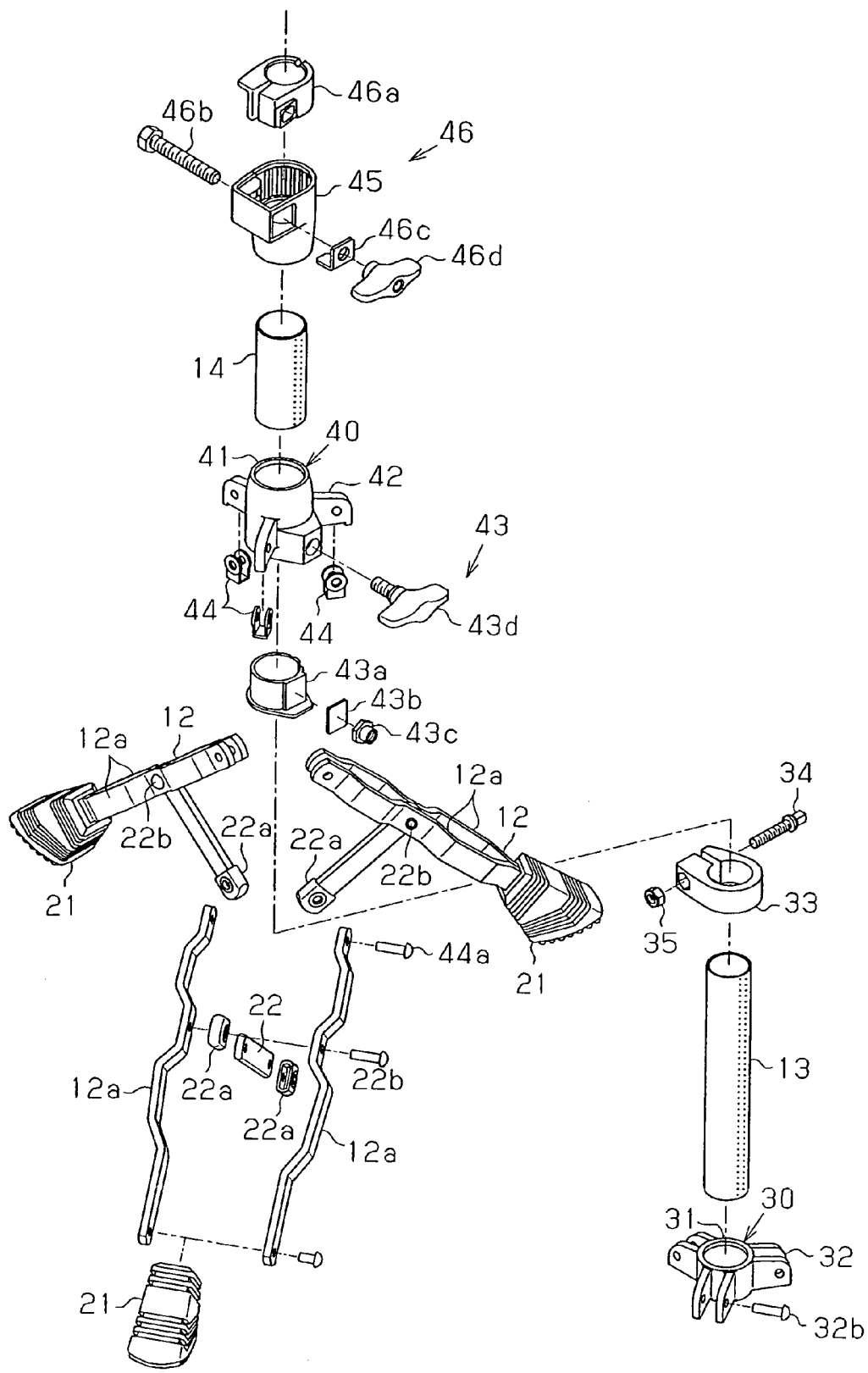
FIG. 4 is an exploded perspective view showing a stand body of the snare drum stand shown in FIG. 1.

Referring to FIGS. 2 to 4, in the stand body 11, the lower pipe 13 has an upper end inserted into the intermediate pipe 14, and the upper pipe 15 has a lower end inserted into the intermediate pipe 14. The lower pipe 13 and the upper pipe 15 are inserted into the intermediate pipe 14 so that the upper pipe 15 is movable in the lower pipe 13. A cap 50 is attached to the lower end of the upper pipe 15 to function as a guide member that guides the insertion of the upper pipe 15 into the lower pipe 13. Further, an opening 13a is defined at the lower end of the lower pipe 13 so that the lower end of the upper pipe 15 can be projected downward out of the lower pipe 13.

A cylindrical stay support 30 is fitted to the lower end of the lower pipe 13. The stay support 30 includes a cylinder 31 and three braces 32. The braces 32 are arranged at equal intervals on the outer surface of the cylinder 31.

A cylindrical leg support 40 is fitted to the lower end of the intermediate pipe 14. The leg support 40 includes a cylinder 41 and three tabs 42. The tabs 42 are arranged at equal intervals on the outer surface of the cylinder 41.

A clamp mechanism 43 functioning as a holding mechanism is formed on the leg support 40. The leg support 40 includes a bushing 43a, which is arranged in the leg support 40, a pressing plate 43b, a clamping nut 43c, and a T-shaped bolt 43d. The distal end of the T-shaped bolt 43d is inserted through the clamping nut 43c and pressed against the pressing plate 43b and the bushing 43a. This reduces the diameter of the annular bushing 43a so that the bushing 43a clamps the outer surface of the lower pipe 13. Thus, by fastening the T-shaped bolt 43d, the bushing 43a clamps the lower pipe 13 and fixes the lower pipe 13 to the intermediate pipe 14. The T-shaped bolt 43d is loosened to release the lower pipe 13 from the bushing 43a. This enables the lower pipe 13 to move axially with respect to the intermediate pipe 14.

Each leg 12 has an upper end pivotally connected to one of the tabs 42 of the leg support 40 by a ring 44 and a connection pin 44a. Each leg 12 includes two opposing elongated plates 12a and a rubber stopper 21 attached to the distal portion of the plates 12a.

Each leg 12 has a middle portion pivotally connected to one end of a stay 22 by a holder 22a and a connection pin 22b. The other end of the stay 22 is pivotally connected to one of the braces 32 of the stay support 30 by another holder 22a and a connection pin 32b. Accordingly, the two ends of each stay 22 are pivotally connected to the middle portion of the corresponding leg 12 and brace 32.

In the lower part of the stand body 11 that is formed in this manner, the position of the lower pipe 13 relative to the intermediate pipe 14, or the insertion amount of the lower pipe 13 in the intermediate pipe 14, is changed to spread or fold the legs 12. Further, a generally annular key lock 33 is attached to a median position of the lower pipe 13 by a bolt 34 and nut 35. The key lock 33 determines the highest position of the lower pipe 13 relative to the intermediate pipe 14. In other words, the key lock 33 determines the extent to which the legs 12 can be spread out.

In the upper part of the stand body 11, a support sleeve 45, which includes a height adjustment mechanism 46, is attached to the upper end of the intermediate pipe 14. The height adjustment mechanism 46 includes a bushing 46a arranged in the support sleeve 45, a bolt 46b inserted into the support sleeve 45 from a sideward direction, a pressing plate 46c, and a T-shaped nut 46d mated with the bolt 46b. The T-shaped nut 46d is fastened to fix the upper pipe 15 to the support sleeve 45 with the pressing plate 46c and the bushing 46a. This fixes the upper pipe 15 to the intermediate pipe 14. By loosening the T-shaped nut 46d, adjustment of the position of the upper pipe 15 relative to the intermediate pipe 14 is enabled. In the preferred embodiment, the leg support 40, the intermediate pipe 14, and the support sleeve 45 are formed from separate members and integrally assembled together.

Referring to FIG. 1, the basket 16 is pivotally connected to the upper end of the stand body 11 by an angle adjustment mechanism 52. The basket 16 includes three support arms 60. Each arm 60 has a distal portion 60a for holding a lower hoop 1a of the snare drum 1.

The operation of the snare drum stand 10 will now be described with reference to FIGS. 2 and 3.

When using the snare drum stand 10, the T-shaped bolt 43d of the clamp mechanism 43 shown in FIG. 3 is first loosened to enable adjustment of the position of the lower pipe 13 relative to the intermediate pipe 14. Then, the lower pipe 13 is moved upward as viewed in FIG. 3 to increase the insertion amount of the lower pipe 13 in the intermediate pipe 14 so that the stay support 30 approaches the leg support 40. As the stay support 30 approaches the leg support 40, the stays 22 move the legs 12 away from the lower pipe 13. This pivots each leg 12 upward about the associated connection pin 44a. The lower pipe 13 is inserted into the intermediate pipe 14 until the key lock 33 abuts against the leg support 40. Then, the T-shaped bolt 43d is fastened to fix the lower pipe 13 at the usage position as shown in the state of FIG. 2 and hold the legs 12 in a spread out state.

When folding the snare drum stand 10, the T-shaped bolt 43d is first loosened to enable adjustment of the position of the lower pipe 13 relative to the intermediate pipe 14. Then, the lower pipe 13 is moved downward as viewed in FIG. 2 to decrease the insertion amount of the lower pipe 13 in the intermediate pipe 14 so that the stay support 30 moves away from the leg support 40. As the stay support 30 moves away from the leg support 40, the stays 22 move the legs 12 toward the lower pipe 13. This pivots each leg 12 downward about the associated connection pin 44a. The lower pipe 13 is pulled out of the intermediate pipe 14 until the legs are completely folded. Then, the T-shaped bolt 43d is fastened to fix the lower pipe 13 at the storage position as shown in the state of FIG. 3 and hold the legs 12 in a folded state.

Figures 5A, 5B:
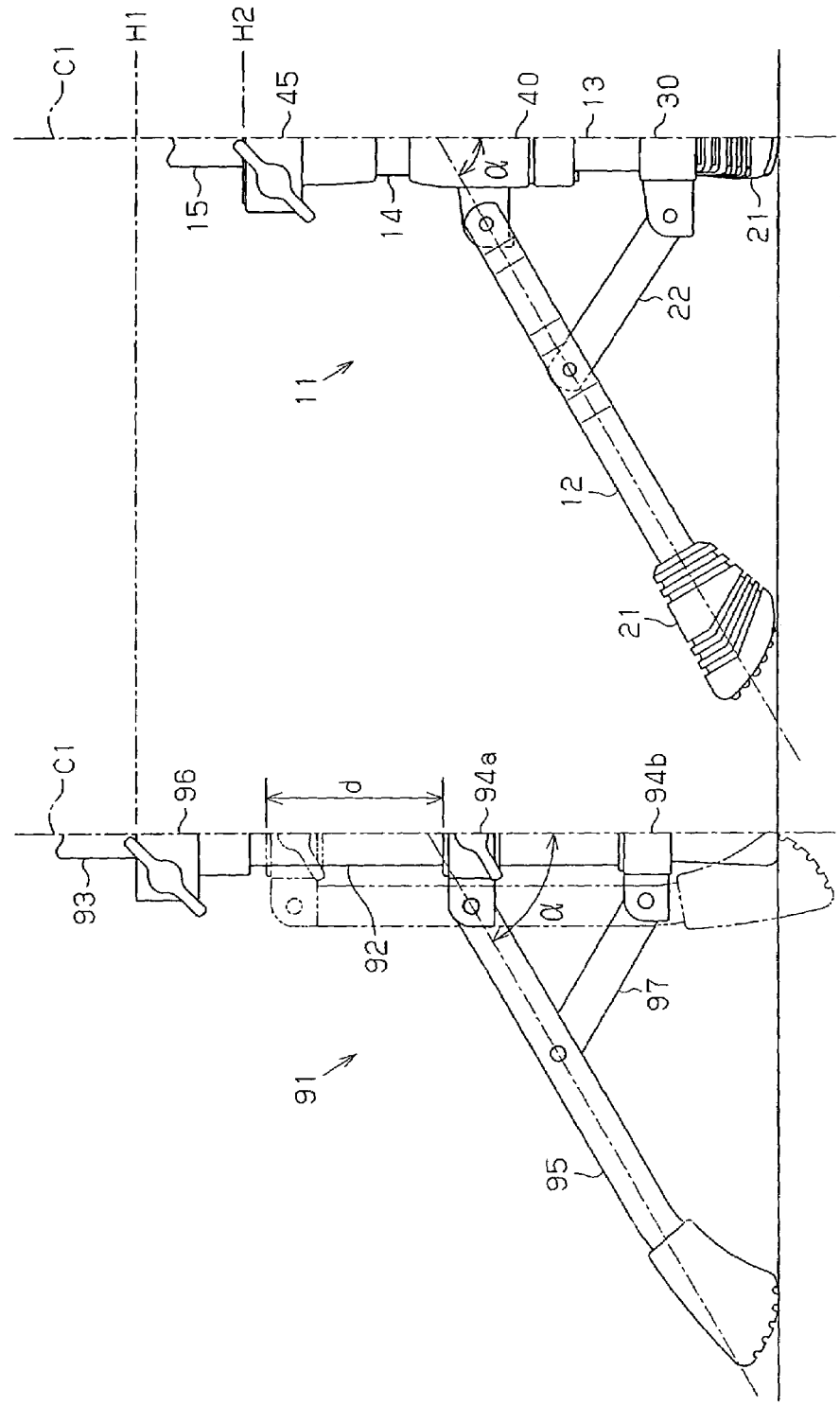
FIG. 5(A) is a partial front view showing the snare drum stand of FIG. 1 in a lowest state.
FIG. 5(B) is a partial front view showing a snare drum stand of the prior art in its lowest state.
Figure 7:
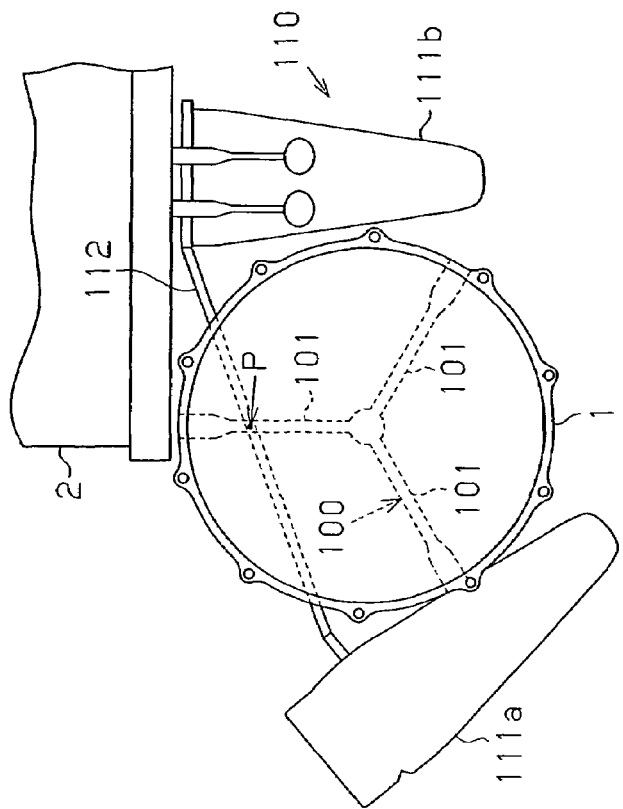
FIG. 7 is a schematic plan view showing the snare drum stand of FIG. 6 in a state interfering with part of a twin pedal.

The effect of the snare drum stand 10 will now be described with reference to FIGS. 5(A) and 5(B) through comparison with the prior art. FIG. 5(A) shows the lower part of the snare drum stand 10 in the preferred embodiment, and FIG. 5(B) shows the lower part of the snare drum stand in the prior art.

As shown in FIG. 5(B), in the snare drum stand of the prior art, the stand body 91 includes the lower pipe 92 and the upper pipe 93. The lower end of the upper pipe 93 is inserted into the lower pipe 92. The movable sleeve 94a, which is fitted to the lower pipe 92, is moved downward toward the fixed sleeve 94b to spread out the legs 95. In this case, the length of the lower pipe 92 is determined in accordance with the movable range d of the movable sleeve 94a. Thus, the position of the upper end of the support sleeve 96 cannot be lower than height H1 as indicated in FIG. 5(B).

The snare drum stand 10 of the preferred embodiment differs from the stand of the prior art in that the stay support 30 moves integrally with the lower pipe 13. Thus, when the stay support 30 moves toward the leg support 40, the insertion amount of the lower pipe 13 into the intermediate pipe 14 increases and the legs 12 are spread out. The insertion of the lower pipe 13 into the intermediate pipe 14 decreases the length of the entire stand body 11. Further, the leg support 40 does not move upward from the state shown in FIG. 5(A). This enables the upper end of the support sleeve 45 to be located at height H2, which is lower than height H1. Further, the structure in which the stay support 30 is moved toward the leg support 40 to spread out the legs 12 with the stays 22 is the same as the structure of the prior art. Thus, the angle α from the axis C1 of the stand body 11 at which the legs 12 are spread out is the same as that in the prior art.

The preferred embodiment has the advantages described below.

(1) The stay support 30 is attached to the lower pipe 13, and the leg support 40 is attached to the intermediate pipe 14. The stay support 30 moves integrally with the lower pipe 13. Thus, movement of the stay support 30 toward the leg support 40 increases the insertion amount of the lower pipe 13 in the intermediate pipe 14 and spreads out the legs 12. This inserts the lower pipe 13 into the intermediate pipe 14 and decreases the length of the stand body 11. As a result, the position where the basket 16 supports the snare drum 1 may be lowered. Accordingly, even if the snare drum 1 has a long shell, the batter head of the snare drum 1 may be set at a height in which the snare drum 1 can easily be played. This enables the snare drum 1 to be played in an optimal manner.

(2) The stay support 30 is attached to the lower end of the lower pipe 13. Thus, in a state in which the legs 12 are spread out, the lower pipe 13 is deeply inserted into the intermediate pipe 14 so as to further decrease the length of the stand body 11. This enables the position at which the basket 16 supports an article to be further lowered.

Figure 6:
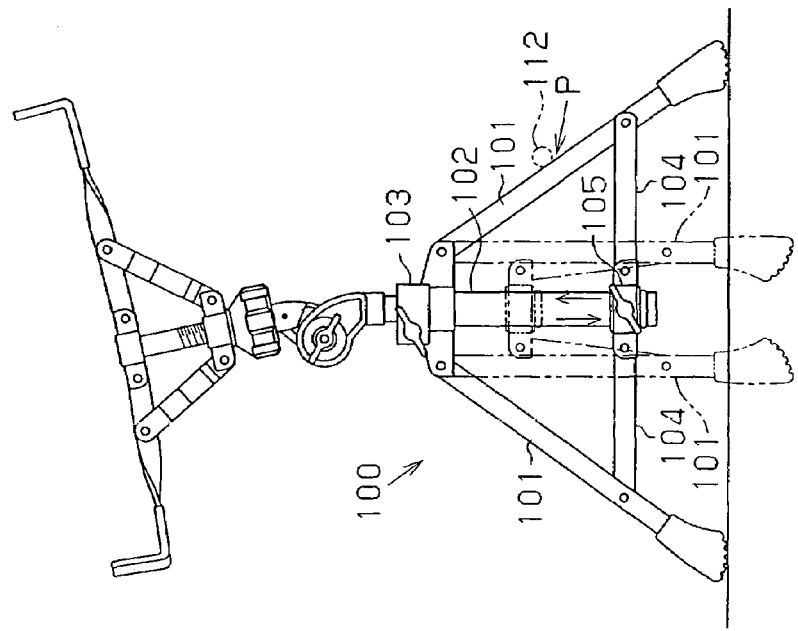
FIG. 6 is a front view showing the entire structure of a snare drum stand in the prior art.

(3) The leg support 40 is attached to the lower end of the intermediate pipe 14. Thus, the distance between the leg support 40 and the stay support 30 is further decreased when the lower pipe 13 is inserted into the intermediate pipe 14. This ensures that the spread angle α of the legs 12 with respect to the stand body 11 is sufficient. As a result, a large space does not have to be provided under the basket 16 for the legs 12 to be spread out like the stand 100 shown in FIG. 6. Additionally, the position at which the bascket 16 supports an article may be further lowered.

(4) The clamp mechanism 43 is formed in the leg support 40. After changing the position of the lower pipe 13 with respect to the intermediate pipe 14, the lower pipe 13 is fixed to the intermediate pipe 14 with the clamp mechanism 43. This holds the legs 12 in a spread state and in a folded state.

(5) The height adjustment mechanism 46 is formed in the support sleeve 45. The height adjustment mechanism 46 enables the upper pipe 15 to be fixed after changing the position of the upper pipe 15 relative to the intermediate pipe 14. Thus, by adjusting the length of the stand body 11, the position of the batter head of the snare drum 1 may be adjusted so that the snare drum 1 can easily be played.

(6) The upper pipe 15 is inserted into the lower pipe 13, which is further inserted into the intermediate pipe 14. In other words, the lower pipe 13 and the upper pipe 15 are movably inserted in the intermediate pipe 14. This enables the position in which the basket 16 supports the snare drum 1 to be further lowered.

(7) The cap 50, which functions as a guide member, is attached to the lower end of the upper pipe 15. When inserting the lower pipe 13 into the intermediate pipe 14 and when inserting the upper pipe 15 into the intermediate pipe 14, the cap 50 smoothly guides the outer surface of the upper pipe 15 along the inner surface of the lower pipe 13. This smoothly spreads out the folded legs 12 and smoothly retracts the upper pipe 15 into the intermediate pipe 14. Thus, the handling of the snare drum stand 10 is facilitated.

(8) The lower end of the lower pipe 13 includes the opening 13a from which the lower end of the upper pipe 15 projects. Thus, the upper pipe 15 may be inserted into the intermediate pipe 14 in a state in which the upper and lower ends of the upper pipe 15 project out of the two ends of the lower pipe 13. This ensures that the upper pipe 15 has sufficient dimensions. Thus, the position at which the basket 16 supports the snare drum 1 may be adjusted within a wide range.

It should be apparent to those skilled in the art that the present invention may be embodied in many other specific forms without departing from the spirit or scope of the invention. Particularly, it should be understood that the present invention may be embodied in the following forms.

In the preferred embodiment, the stay support 30 is attached to the lower end of the lower pipe 13. However, the stay support 30 may be attached to the lower pipe 13 at a position above the lower end. In such a case, the position at which the basket 16 supports the snare drum 1 may also be lowered.

In the preferred embodiment, the leg support 40 is attached to the lower end of the intermediate pipe 14. However, the leg support 40 may be attached to the intermediate pipe 14 at a position above the lower end. In such a case, the position at which the basket 16 supports the snare drum 1 may also be lowered.

The upper pipe 15 and the height adjustment mechanism 46 may be eliminated from the snare drum stand 10 of the preferred embodiment. In such a case, the length of the stand body 11 cannot be adjusted. However, the support position of the snare drum 1 may be lowered.

In the preferred embodiment, the leg support 40, the intermediate pipe 14, and the support sleeve 45 are separate components. However, the leg support 40, the intermediate pipe 14, and the support sleeve 45 may be formed integrally into a single component. This would reduce the number of components and the number of assembly processes thereby lowering manufacturing cost.

In the preferred embodiment, the lower pipe 13 is inserted into the intermediate pipe 14, and the upper pipe 15 is inserted into the lower pipe 13. However, the positional relationship between the lower and upper pipes 13 and 15 may be changed so that the upper pipe 15 is inserted into the intermediate pipe 14, and the lower pipe 13 is inserted into the upper pipe 15.

The cap 50 attached to the lower end of the upper pipe 15 in the preferred embodiment may be eliminated. Alternatively, the cap 50 may be formed integrally with the lower end of the upper pipe 15.

In the preferred embodiment, the stand is used a snare drum stand. However, the stand may also be used for percussion instruments other than the snare drum 1 such as other types of drums, a xylophone, or a metallophone. Further, the stand may be used for articles other than musical instruments, for example, as a music stand or as a tripod for cameras.

The present examples and embodiments are to be considered as illustrative and not restrictive, and the invention is not to be limited to the details given herein, but may be modified within the scope and equivalence of the appended claims.

What is claimed is:

1. A stand for supporting an article, the stand comprising:
a basket for receiving the article;
a stand body for supporting the basket;
a plurality of legs pivotally connected to the stand body, the stand body including:

a main pipe;

a lower pipe having an upper end inserted into the main pipe;

a leg support arranged on the main pipe, each leg being pivotally connected to the main pipe by the leg support;

a stay support arranged on the lower pipe; and a plurality of stays, each connected to a corresponding one of the legs and pivotally connected by the stay support to the lower pipe, with position of the lower pipe relative to the main pipe being changeable so that the leg support and the stay support move toward each other and spread the legs outward with the stays, and the position of the lower pipe relative to the main pipe being changeable so that the leg support and the stay support move away from each other and fold the legs with the stays.

2. The stand according to claim 1, wherein the position of the lower pipe relative to the main pipe is adjusted by changing an insertion amount of the lower pipe in the main pipe.

3. The stand according to claim 1, wherein the stay support is arranged at a lower end of the lower pipe.

4. The stand according to claim 3, wherein the stay support moves integrally with the lower pipe.

5. The stand according to claim 1, further comprising:
a positioning member for determining the position of the lower pipe relative to the main pipe.

6. The stand according to claim 5, wherein the positioning member is annular and fitted around the lower pipe.

7. The stand according to claim 1, wherein the leg support is arranged at a lower end of the main pipe.

8. The stand according to claim 1, further comprising:
a holding mechanism for fixing the lower pipe to the main pipe.

9. The stand according to claim 1, wherein the main pipe includes an intermediate pipe, an upper pipe attached to the basket and having a lower end inserted into the intermediate pipe, and an adjustment mechanism for adjusting a position of the upper pipe relative to the intermediate pipe.

10. The stand according to claim 9, further comprising:
a support sleeve for holding the adjustment mechanism at an upper end of the intermediate pipe.

11. The stand according to claim 10, wherein the leg support, the intermediate pipe, and the support tube are integrated.

12. The stand according to claim 9, wherein the lower and upper pipes are inserted into the intermediate pipe so that the upper pipe is movable in the lower pipe.

13. The stand according to claim 9, further comprising:
a guide member arranged on the lower end of the upper pipe for guiding the insertion of the upper pipe into the lower pipe.

14. The stand according to claim 13, wherein the guide member is a cap attached to the lower end of the upper pipe.

15. The stand according to claim 9, wherein the lower pipe has a lower end having an opening, the lower end of the upper pipe being projectable downward through the opening.

16. The stand according to claim 1, wherein the basket is pivotally arranged on an upper end of the stand body.

17. The stand according to claim 16, further comprising:
an angle adjustment mechanism for adjusting an angle of the basket relative to the stand body.

18. The stand according to claim 1, wherein the article is a percussion instrument.

19. The stand according to claim 18, wherein the percussion instrument is a snare drum.

* * * * *

UNITED STATES PATENT AND TRADEMARK OFFICE
CERTIFICATE OF CORRECTION

PATENT NO. : 7,365,257 B2  Page 1 of 1
APPLICATION NO. : 11/252648
DATED : April 29, 2008
INVENTOR(S) : Naoki Sato It is certified that error appears in the above-identified patent and that said Letters Patent is hereby corrected as shown below:

On the Title Page:
Item (73) Assignee should read:

Hoshino Gakki Mfg. Co., Ltd. (JP)

Signed and Sealed this

Twenty-second Day of July, 2008

JON W. DUDAS
*Director of the United States Patent and Trademark Office*